US006533858B1

(12) United States Patent
Cacace et al.

(10) Patent No.: US 6,533,858 B1
(45) Date of Patent: Mar. 18, 2003

(54) EFFECT PIGMENTS WITH IMPROVED COLORANT ADHESION

(75) Inventors: Deborah Cacace, Cold Spring, NY (US); Daniel S. Fuller, Beacon, NY (US)

(73) Assignee: Engelhard Corporation, NJ (US)

( * ) Notice: Subject to any disclaimer, the term of this patent is extended or adjusted under 35 U.S.C. 154(b) by 204 days.

(21) Appl. No.: 09/685,502

(22) Filed: Oct. 10, 2000

(51) Int. Cl.[7] ............................ C04B 14/20; C04B 14/00
(52) U.S. Cl. ..................... 106/416; 106/418; 106/499
(58) Field of Search ............................ 106/416, 418, 106/499

(56) References Cited

U.S. PATENT DOCUMENTS

| 3,038,099 | A | | 6/1962 | Baker et al. | |
|---|---|---|---|---|---|
| 3,087,828 | A | | 4/1963 | Linton | |
| 3,418,146 | A | | 12/1968 | Rieger et al. | |
| 3,437,515 | A | | 4/1969 | Quinn et al. | |
| 4,084,983 | A | | 4/1978 | Bernhard et al. | |
| 4,755,229 | A | * | 7/1988 | Armanini | 106/413 |
| 4,828,623 | A | | 5/1989 | Nitta et al. | |
| 5,091,011 | A | | 2/1992 | DeLuca, Jr. | |
| 5,286,291 | A | | 2/1994 | Bernhardt et al. | |
| 5,356,471 | A | | 10/1994 | Reynders | |
| 5,423,912 | A | | 6/1995 | Sullivan et al. | |
| 5,472,491 | A | | 12/1995 | Duschek et al. | |
| 5,759,255 | A | * | 6/1998 | Venturini et al. | 106/417 |
| 6,325,846 | B1 | * | 12/2001 | Bagala et al. | 106/401 |

FOREIGN PATENT DOCUMENTS

| EP | 0-278633 | 8/1988 |
|---|---|---|
| EP | 0-367236 | 5/1990 |
| EP | 0-919598 | 6/1999 |
| WO | WO-9830637 | 7/1998 |

* cited by examiner

*Primary Examiner*—Mark L. Bell
*Assistant Examiner*—Shalie Manlove
(74) *Attorney, Agent, or Firm*—Dickstein, Shapiro, Morin & Oshinsky, LLP

(57) ABSTRACT

Non-bleeding, non-agglomerated, lustrous colored combination pigments constitute a platy substrate and absorption colorant bound thereto with metal hydroxides and one or more hydrolyzed silane coupling agents.

20 Claims, No Drawings

EFFECT PIGMENTS WITH IMPROVED COLORANT ADHESION

BACKGROUND OF THE INVENTION

The present invention relates to platy pigments with a highly adherent colorant.

Colored lustrous pigments are known in which the lustrous pigment part is a natural pearlescent material or synthetic pearlescent substance (also called nacreous pigments) and the colors are a wide variety of inorganic and organic coloring agents or dyestuffs. The processes used to make colored lustrous pigments in prior art encountered numerous difficulties among which the following are noteworthy: severe bleeding of the color on filtration of the coated product from the suspension; poor adherence to the surface of the pigment in that the color could be washed off with water; difficulty of retaining luster with increased color intensity; and nonuniform distribution of the colorant on the pigment surface.

The foregoing problems are in part described in U.S. Pat. No. 4,084,983. This patent relates to the use of titanium dioxide-coated-mica pigments to produce colors due to interference phenomena and additional color effects achieved by coating organic dyes on the surface of these pigments. In an attempt to overcome the problems encountered in the art, the dyestuff is chemically bound on the surface of the pigment with the help of a laking reagent. For example, one laking reagent used was aluminum chloride which on hydrolysis produced layers of aluminum hydroxide with which the dye reacted to form the insoluble color lake, thereby permitting it to deposit on the surface of the pigment. Although this approach particularly addresses the problem of poor adherence of the organic dye on the surface of the pigment, the problem of heavy bleeding of the uncoated dye remained severe. The failure of the previous art to control this problem was a serious obstacle in developing a suitable process of preparing colored lustrous pigments of superior quality.

A significant advance in the art is described in U.S. Pat. No. 4,968,351. This provides an efficient laking process which is practical and economical for preparing dye-coated pigments with strong color intensity and superior luster.

Another significant advance in the art is described in U.S. Pat. No. 4,755,229 in connection with combination pigments, i.e., pearlescent pigments further coated with an absorption pigment, so-called because it absorbs some portion of the visible spectrum. Absorption pigments which are not soluble in water and which cannot be formed in place from a water-soluble reactant(s) are deposited using an oxide or hydroxide of a polyvalent cation and an anionic polymeric substance. Since that procedure was developed in the 1980's, the conditions to which such colored nacreous pigments have been subjected have become even more severe, thereby requiring further improvements in color adhesion. Furthermore, that process was particularly adopted for use in products which are subjected to inherently more severe processing conditions during manufacturing, as for instance, incorporation into a mass of plastic.

A pearlescent pigment having improved humidity resistance and weatherability is described in U.S. Pat. No. 5,759,255. This pigment is realized by a metal oxide-coated mica pearlescent pigment which has an aluminum or an aluminum-cerium combined with a hydrolyzed silane coupling agent treated surface. It has now been surprisingly discovered that the hydrolyzed silane coupling agent treatment when used in conjunction with the pigments of the aforementioned U.S. Pat. No. 4,755,229 give rise to improved non-bleeding, non-agglomerated, lustrous colored nacreous pigments with excellent weatherability.

SUMMARY OF THE INVENTION

This invention relates to colored lustrous pigments of superior quality and to processes for producing them. More particularly, the invention pertains to colored lustrous platy materials, especially metal oxide-coated substrate nacreous or pearlescent pigments, which are colored with an absorption colorant and contain a hydrolyzed silane coupling agent treated surface and a process for producing such pigments. The products of the invention are preferably chromium-free. They exhibit improved adhesion of the colorant coupled with enhanced weatherability. The products are of particular use in liquid coating such as the solvent and water borne automotive paint systems combining a pigmented basecoat and a clear top coat.

The invention thus provides a lustrous colored platy substrate, e.g., a nacreous pigment comprising metal oxide-coated substrate nacreous pigment particles, whose surface has been coated with a first coating layer comprising anionic polymeric substance and water-insoluble colored pigment, said pigment having a second coating layer thereon consisting essentially of hydrated aluminum oxide or combination of hydrated cerium and aluminum oxide and a coating of hydrolyzed silane coupling agent on or intermingled with said second coating. The pigment is essentially non-bleeding and non-agglomerated, i.e., bleeding is substantially reduced if not eliminated compared to prior art pigments.

The invention also provides method of producing the pigment by combining an aqueous suspension of platelets with an aqueous suspension of a water-insoluble colored pigment containing an anionic polymeric substance, and thereafter forming a coating consisting essentially of a hydrated aluminum oxide or combination of hydrated aluminum-cerium oxide on the platelets and combining said platelets with a hydrolyzed silane coupling agent simultaneously or subsequently with the formation of said coating.

DESCRIPTION OF THE INVENTION

In accordance with the present invention, a superior pigment, e.g., a combination nacreous pigment, is produced basically in accordance with the process described in the aforementioned U.S. Pat. No. 4,755,229, which is hereby incorporated by reference, and then is post-treated with a hydrolyzed complexing agent.

The substrate to be treated can be any platy material such as mica flakes, titanium dioxide, sericite, kaolin, gypsum, bismuth oxychloride, glass and the like. Suitable mixtures of platy substrates may also be used. Usable coated platelets are exemplified by titanium dioxide-, zirconium dioxide- and/or iron oxide-coated mica or coated glass. The substrate may also be an optically variable pearlescent or effect pigment.

Preferred are the well-known metal-oxide coated mica or glass nacreous or pearlescent pigments. The metal oxide coated substrate nacreous pigments are well known and are exemplified by titanium dioxide and/or iron oxide coated mica. Such pigments are described, inter alia, in U.S. Pat. Nos. 3,437,515; 3,418,146; 3,087,828 and 4,038,099. A preferred nacreous pigment is titanium dioxide coated mica. The mica flake substrates generally have a length of about 1–75 microns, preferably about 5–35 microns, and a thickness between about 0.3 and 3 microns. Usually, the titanium dioxide or other metal oxide will be coated on the substrate surface to a thickness of about 20–350 nanometers or such that it is about 50 to 500 mg/m$^2$, depending on the specific surface area of the substrate in m$^2$/g. Depending on the thickness of the metal oxide coating, the pigments can exhibit interference or reflection colors of blue, green, yellow, red, etc.

Absorption pigments which are water insoluble, transparent (i.e. substantially non-light scattering) and which cannot be formed in situ from a water soluble reactant(s) but which may be highly dispersed in water or water-alcohol containing anionic polymer are suitable for the invention. These include, for example, carbon black and organic pigments in the following groups: azo compounds, anthraquinones, perinones, perylenes, pyrroles such as diketopyrrolo pyrroles, quinacridones, thioindigos, dioxazines and phthalocyanines and their metal complexes. The pigments, depending on their color intensity, are used in a concentration range of about 0.01% to about 30% based on the weight of platy substrate, preferably 0.1% to 10%.

Colors may be adjusted if desired by mixing combination pigments. In general, it is preferred to mix pigments of the same or similar reflection color, since reflection colors mix additively and color intensity is reduced when very different reflection colors are mixed. The absorption pigment components mix subtractively, and the usual pigment blending procedures are followed.

The post-treatment of the pigment will now be described.

Coating of a metal oxide-coated mica pigment with a hydrous aluminum oxide per se is known. It has been described, for example, in U.S. Pat. No. 5,091,011, the disclosure of which is incorporated herein by reference. That procedure is used in the present invention. Briefly, the pigment is dispersed by stirring in water and then an aluminum compound such as aluminum chloride, aluminum sulfate or aluminum potassium sulfate, and a neutralizing agent such as sodium hydroxide, potassium hydroxide, ammonia or urea, are added simultaneously as aqueous solutions. The resulting hydrolysis causes a hydrous oxide to deposit on the substrate. As described, the aluminum compound must be added slowly enough to permit the formation of a smooth, continuous layer on the platelets and the rate should fall within the range of about 0.03 to 0.1 mg Al per minute per gram of pigment, preferably about 0.005 to 0.07 mg Al/min/g pigment. A quantity of aluminum compound solution is used so as to produce a hydrous aluminum oxide coating containing about 0.05 to 1.2% aluminum, preferably about 0.1 to 0.8% aluminum, based on the total weight of the pigment. Pigments in which the concentration of aluminum is above 1.2% are less effective in stabilization than lower concentrations. After deposition of the coating, the product can be filtered, washed with water and dried at any convenient temperature. Use of a temperature which is high enough to calcine (crystallize) the hydrous aluminum oxide (amorphous aluminum oxyhydroxide) should be avoided.

The coating of a titanium dioxide- or iron oxide-coated mica pearlescent pigment with a coating consisting essentially of a combination of hydrated cerium and aluminum oxides is also per se known. It is described, for instance, in U.S. Pat. No. 5,423,912, the disclosure of which is incorporated herein by reference. The known procedure can be used. Briefly, the pigment is dispersed in a liquid from which the cerium and aluminum can be readily precipitated onto the surface of the pigment. This conveniently, and preferably, is an aqueous dispersion. The solid pigment in the dispersion generally comprises about 5 to 30%, preferably about 10 to 20%, and the cerium and aluminum are each added to the dispersion in the form of a salt which is soluble in a liquid medium. While other salts can be used, the nitrate salts are preferred. It is also preferred to deposit about 0.1–1.5% cerium hydroxide, more preferably 0.2–0.6%, calculated as weight percent cerium and about 0.1–1%, more preferably 0.2–0.6%, aluminum hydroxide, calculated as weight percent aluminum, based on the weight of the pigment. The salts can be added to the slurry individually in either order and precipitated or preferably, added simultaneously and precipitated. Precipitation is controlled by raising the pH to a value greater than about 5, preferably to a value of about 5.5–7.5. After completion of the precipitation step, the treated product is separated from the dispersion by any convenient means such as, for instance, filtration, centrifugation or settling, and then washed and dried.

The aluminum- or aluminum-cerium-treated platy substrate such as a metal oxide-coated mica pearlescent pigment of this invention is additionally treated with a hydrolyzed silane coupling agent or a mixture of such agents. These, as known, are compounds which act as an interface between an organic material and an inorganic material to enhance the affinity between the two.

Thus, the silane coupling agents generally have both an organo functional group and a hydrolyzable functional group bonded either directly or indirectly to silicon. The hydrolyzable functional groups are generally alkoxy groups and preferably $C_{1-4}$ alkoxy groups.

Examples of silane coupling agents which can be used in the present invention are gamma-(2-aminoethyl) aminopropyltrimethoxysilane, gamma-aminopropyltrimethoxy silane, gamma-aminopropyltriethoxysilane, gamma-(2-aminoethyl) aminopropylmethyldimethoxy silane, gamma-methacryryloxypropyltrimethoxy silane, gamma-glycidoxypropyltrimethoxysilane, gamma-mercaptopropyltrimethoxy silane, vinyltriacetoxysilane, gamma-chloropropyltrimethoxysilane, vinyltrimethoxysilane, octadecyldimethyl-[3-(trimethoxysilyl)-propyl]ammonium chloride, gamma-mercaptopropylmethyldimethoxy silane, methyltrichlorosilane, dimethyldichlorosilane, trimethylchlorosilane, gamma-isocyanatopropyltriethoxy silane and the like.

The silane coupling agent should be selected so that it is suitable for any organic material in the coating vehicle which will be combined with the pigment in use. When the organic material is a polyester, the organo functional group preferably comprises a methacryl group. When it is a urethane, an amino functional coupling agent is preferred. For acrylic vehicles, the aminoethyl, aminopropyl, methacryloxypropyl and glycidoxypropyl trimethoxy silanes are suitable. Good results can occur with a combination of amino and non-amino coupling agents.

The pigment is treated with the silane coupling agent by dry or wet mixing. For instance, an aqueous solution of the agent in water or a mixture of water and an organic solvent can be added to an aqueous slurry of the pigment. The silane is preferably prehydrolyzed such as, for instance, by stirring the coupling agent in water for a suitable period of time. It is also possible to effect hydrolysis at the time of mixing. In general, about 0.1 to 10 wt %, preferably about 0.25 to 5 wt %, of the silane coupling agent is used based on 100 parts by weight of pigment being treated. The coupling agent and pigment are combined for a period of time sufficient to allow reaction to occur, which may last from a few minutes to several hours or more, preferably about 3 to 24 hours. Thereafter the treated pigment can be recovered in the conventional fashion such as by filtration, centrifugation and the like, and dried. It is also possible to combine, if desired, the coupling agent treatment with the aluminum/cerium treatment.

The new combination pigments may be used in all the usual applications for nacreous or effect pigments: in paints and other coatings, incorporated in plastics and in cosmetics when the components are acceptable for this use. Furthermore, the specific colors of the combination pigment may be modified, if desired, by the addition of other absorption colorants to the formulation in the conventional way.

In order to further illustrate the present invention, various non-limiting examples are set forth below. In these examples, as throughout the specification and claims, all parts and percentages are by weight and all temperatures in ° C. unless otherwise indicated.

EXAMPLE 1

A charge of 300 parts of a russet colored iron oxide-coated mica was dispersed in 2000 parts of water. The dispersion was heated to 70–80° C. and the pH adjusted to 3 with dilute hydrochloric acid. A dispersion of phthalocyanine blue and 10% xanthan gum was added. After stirring for 15–30 minutes, 3 parts of a cerium nitrate solution (about 20% Ce) and 10.5 parts of an aluminum nitrate solution (about 4% Al) were added. After stirring for an additional 15–30 minutes, the pH was raised to 6.5 with dilute caustic.

Thereafter, 6 parts of gamma-glycidoxypropyltrimethoxysilane was added followed by adding 6 parts of gamma-aminopropyltriethoxysilane. The resulting slurry was stirred for 1 hour, filtered, washed with distilled water and then dried at 120° C.

The resulting colored pearlescent pigment is useful in any application in which pearlescent pigments have been used heretofore including, inter alia, inks, coatings (both industrial and automotive) and in plastics.

EXAMPLE 2

Example 1 is repeated, substituting a titanium dioxide-coated mica pigment with a blue interference reflection color (about 53% $TiO_2$).

EXAMPLES 3–9

Example 1 is repeated except that the pearlescent pigment was replaced with a titanium dioxide-coated mica pigment with a red or green interference reflection color and the absorption pigment was replaced with either phthalocyanine blue or phthalocyanine green; or the pearlescent pigment was replaced with a titanium dioxide-coated mica pigment with a gold interference reflection color and for each, the absorption pigment was replaced with carbazole violet (Pigment Violet 23); or the pearlescent pigment was replaced with a iron oxide-coated mica pigment with a bronze interference reflection color and the absorption pigment was replaced with phthalocyanine blue; or the pearlescent pigment was replaced with an iron oxide-coated mica pigment with a copper interference reflection color and the absorption pigment was replaced with phthalocyanine green.

EXAMPLE 10

The effect of ultrasonification on the combination pigment of Example 1 was studied to test the adhesion of the blue colorant on the pearlescent substrate.

Ultrasonification creates a mechanical "scrubbing" action on the surfaces of the pigment in contact with liquid medium. The ultrasonic waves, sound waves with frequencies above the range of human hearing, are produced to generate vibrations in the liquid medium to thereby produce alternating high and low pressure waves which form millions of microscopic bubbles. These microbubbles expand in size during the low pressure ultrasonic wave and form microcavities. During the high pressure wave, the microcavities collapse or implode producing a blasting effect which cleans residues and accumulations at the surfaces immersed in the liquid medium. In the procedure employed, the ultrasonic machinery (Branson Model B3) causes microcavity collapse to take place 40,000 times per second. The samples were sonified for a period of time and then examined by scanning electron imaging microscopy using a Japanese Electron Optics Laboratory SEM model EM-ASID4D operated at 100 keV. If no significant colorant bleeding was observed, the sonification and examination sequence was repeated. A combination pigment produced in the same manner but without the silane treatment was also studied.

After 5 seconds sonification, the non-silane treated combination pigment exhibited extensive colorant bleeding. The silane treated combination pigment showed no significant colorant bleeding after two 5 minute sonifications.

Water-based paints were prepared by incorporating either the silane-aluminum treated iron oxide-coated mica pigment of example 1 or titanium dioxide-coated mica pearlescent pigment of Example 2 into a water based paint composition at a pigment/paint ratio of 0.13. For testing purposes, primed 7.5×15 cm steel panels (APR 25379, supplied by Advanced Coating Technologies of Detroit, Mich.) were coated with 15–30 micron thick pigmented base coat. The base coat was allowed to flash for at least 10 minutes, baked at 85° C. for 6.5 minutes and cooled. Then a clear (unpigmented) top coat was applied to a thickness of 40–45 microns and the resulting panel baked at 140° C. for 30 minutes. Portions of the resulting panels were masked so that exposed portions of the panels could be compared to the non-exposed portions. The panels were then exposed to a 100% humidity atmosphere for 240 hours at about 40° C.

Changes in appearance of the panel before exposure and after exposure were evaluated by making distinctness of image (DOI) measurements using a Dorigon II Distinctness of Reflected Image Goniophotometer manufactured by Hunter Lab. The retained distinctness of image (% DOI) was calculated by dividing DOI after humidity conditioning by the DOI before humidity conditioning and multiplying by 100. Pigments with a higher %DOI retention have a better stability than those with a lower % DOI retention. The pigments of Examples 1 and 2 had a percentage DOI retention of about 84–88 percent and 88–92 percent, respectively. The pigments of the aforementioned prior art U.S. Pat. No. 4,755,229 generally had a %DOI retention in the range of 40 to 60 and in some cases, as low as 20.

EXAMPLE 11

Each of the products of Examples 1–9 was formulated into a paint system, mechanically mixed and then filtered. No color bleeding was observed. For comparison, the same products without the silane treatment were tested in the same way and strong colorant bleeding was noted.

EXAMPLES 12–14

Example 1 is repeated three times using different combinations of coupling agents. The three combinations are gamma-glydicloxypropyltrimethoxy silane and gamma-aminopropyltriethoxy silane, gamma-aminopropyltriethoxy silane and gamma-methacryloxypropyltrimethoxy silane, and gamma-aminopropyltriethoxy silane and gamma-isocyanatopropyltriethoxy silane.

EXAMPLES 15–16

Example 1 is repeated substituting mica (Example 15) or kaolin (Example 16) for the iron oxide-coated mica.

Various changes and modifications can be made in the process and products of this invention without departing from the spirit and scope thereof. The various embodiments which have been described herein were for the purposes of further illustrating the invention but were not intended to limit it.

What is claimed is:

1. A non-bleeding, non-agglomerated, lustrous colored pigment comprising platy particles whose surface has been coated with a first coating layer comprising anionic polymeric substance and water-insoluble colored pigment, the percentages of said substance and pigment being about 0.01–20 and about 0.01–30, respectively; said pigment having a second coating layer thereon consisting essentially of hydrated aluminum oxide or combination of hydrated cerium and aluminum oxide and a coating of hydrolyzed silane coupling agent on or intermingled with said second coating.

2. The pigment of claim 1 in which said silane coupling agent comprises a non-amino silane coupling agent.

3. The pigment of claim 2 in which said silane coupling agent is a combination of a non-amino silane coupling agent and an amino silane coupling agent.

4. The pigment of claim 1 in which said platy substrate particles are metal oxide-coated substrate pearlescent pigment particles.

5. The pigment of claim 4 in which said silane coupling agent comprises a non-amino silane coupling agent.

6. The pigment of claim 4 in which said silane coupling agent is a combination of a non-amino silane coupling agent and an amino silane coupling agent.

7. The pigment of claim 4 in which the pigment is a titanium dioxide-coated mica.

8. The pigment of claim 4 in which the pigment is an iron oxide-coated mica.

9. The pigment of claim 4 wherein the colored pigment is selected from the group consisting of an azo compound, anthraquinone, perinone, perylene, quinacridone, thioindigo, dioxazine, phthalocyanine, a metal complex thereof, and carbon black.

10. The pigment of claim 1 wherein said colored pigment is about 0.5–6% based on the weight of the pigment.

11. The pigment of claim 1 wherein the colored pigment is selected from the group consisting of an azo compound, anthraquinone, perinone, perylene, quinacridone, thioindigo, dioxazine, phthalocyanine, a metal complex thereof, and carbon black.

12. A method of producing a colored pigment which comprises combining an aqueous suspension of platelets with an aqueous suspension of a water-insoluble colored pigment containing an anionic polymeric substance, and thereafter forming a coating consisting essentially of a hydrated aluminum oxide or combination of hydrated aluminum-cerium oxide on the pigment and combining said pigment with a hydrolyzed silane coupling agent simultaneously or subsequently with the formation of said coating.

13. The method of claim 12, in which said silane coupling agent comprises a non-amino silane coupling agent.

14. The method of claim 12, in which said silane coupling agent is a combination of a non-amino silane coupling agent and an amino silane coupling agent.

15. The method of claim 12, wherein the colored pigment is selected from the group consisting of an azo compound, anthraquinone, perinone, perylene, pyrrole, quinacridone, thioindigo, dioxazine and phthalocyanines and their metal complexes and carbon black.

16. The method of claim 12, in which said platelets comprise pigment of claim 1 in which said platy substrate particles are metal oxide-coated substrate pearlescent pigment particles.

17. The method of claim 16, in which the pigment is a titanium dioxide-coated mica.

18. The method of claim 16, in which the pigment is an iron oxide-coated mica.

19. The method of claim 12, wherein said colored pigment is about 0.25–6% based on the weight of the pigment.

20. The method of claim 19, wherein the colored pigment is selected from the group consisting of an azo compound, anthraquinone, perinone, perylene, pyrrole, quinacridone, thioindigo, dioxazine and phthalocyanines and their metal complexes and carbon black.

* * * * *